(12) United States Patent
Esser

(10) Patent No.: US 7,101,071 B2
(45) Date of Patent: Sep. 5, 2006

(54) OPTICAL ELEMENT FOR A LCD DISPLAY

(75) Inventor: Boudewijn Michael Esser, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/493,620

(22) PCT Filed: Oct. 17, 2002

(86) PCT No.: PCT/IB02/04333

§ 371 (c)(1),
(2), (4) Date: Apr. 23, 2004

(87) PCT Pub. No.: WO03/036162

PCT Pub. Date: May 1, 2003

(65) Prior Publication Data

US 2005/0041427 A1 Feb. 24, 2005

(30) Foreign Application Priority Data

Oct. 24, 2001 (EP) .................................. 01204047

(51) Int. Cl.
*F21V 7/04* (2006.01)
*G02F 1/13357* (2006.01)

(52) U.S. Cl. ........................................ 362/561; 349/62

(58) Field of Classification Search ................ 359/599, 359/613; 349/62, 64, 66; 362/558, 561, 362/355
See application file for complete search history.

(56) References Cited

U.S. PATENT DOCUMENTS 5,247,390 A * 9/1993 Hed ............................. 359/599
6,496,238 B1 * 12/2002 Greene et al. ................ 349/73

FOREIGN PATENT DOCUMENTS

EP 0 816 901 1/1998

\* cited by examiner

*Primary Examiner*—Mark A. Robinson
(74) *Attorney, Agent, or Firm*—Kevin Fortin

(57) ABSTRACT

An optical element for a display unit comprising a first rigid, transparent plate (9b) and at least one flexible optical foil (5), wherein the foil (5) is held to the plate (9b) by means of an underpressure created, for example, by a suction device (17).

The optical element according to the invention overcomes the problem of wrinkling foils by creating an underpressure that presses the foil (5) against the rigid plate (9b), thereby preventing the foil from wrinkling.

According to an embodiment of the invention, the optical element further comprises a second rigid, transparent plate (9a), said optical foil is arranged between the first and second plates, and the plates (9a, 9b) are held together by means of underpressure.

20 Claims, 2 Drawing Sheets

OPTICAL ELEMENT FOR A LCD DISPLAY

The present invention relates to an optical element comprising a first rigid, transparent plate and at least one flexible optical foil. Such an element can be used in general for distributing light from a light source, and in particular in front of the back lighting device of an LCD.

The invention also relates to a method of manufacturing such an optical element and to a display unit, such as an LCD, with such an element.

Certain types of display units, in particular LCD units, require a source of back lighting to light up the screen. This back light is generated by a back lighting device arranged behind the screen. In these cases, there is a need for directing the back light onto the screen, to minimize diffraction and reflection, and for this purpose, it is known to arrange at least one optical foil in front of the back lighting device to influence the light path. Such foils are often made of a thin plastic sheet, with patterns of perpendicular lines formed thereon for affecting any light passing through the foil.

However, the foils tend to wrinkle under the influence of heat from the back lighting device, especially if the area of the foil is large. As a result, the foils may distort the back light after some time of operation if the foils are heated too much.

The same problem is present, for example, in the art of so-called daylight devices. Such devices are designed similarly to the back light device of an LCD and are arranged in the sealing of a room to create pleasant light conditions in doors. Just like the LCD of a monitor, such lighting devices have a large active surface.

In order to alleviate the above problem of wrinkling foils, it is known to place the foils between two glass plates, thereby forming an optical element, also known as an optical stack. Nevertheless, the problem of wrinkling has not been satisfactorily overcome. The reason is that the glass plates cannot be made too thick because of requirements on weight, cost, and optical properties such as reflection and light absorption (a normal thickness of such plates is 1 mm). It is therefore difficult for the plates to impose a strong enough force on the foils, especially if the area of optical element is large.

Attempts have also been made to glue a foil to a glass plate. However, surfaces of the foil formed with the optical patterns mentioned above must not be glued, as the glue would distort the desired optical effect. As a consequence, this solution cannot be used in a case where the surface of the foil facing the plate is patterned, nor where several foils are arranged in a stack.

It is an object of the present invention to alleviate the above problem and to provide an optical element that is less susceptible to wrinkling than conventional elements.

According to a first aspect of the invention, this and other objects are achieved with a method of manufacturing optical elements comprising a first rigid, transparent plate, and at least one flexible optical foil, said method comprising a removal of air from between said plate and said foil.

According to a second aspect of the invention, this and other objects are achieved with an optical element of the kind mentioned by way of introduction, wherein the foil is held to the plate by means of underpressure.

A display unit, such as an LCD, may advantageously be provided with an optical element according to the invention or be used with the method according to the invention.

The optical element according to the invention overcomes the problem of wrinkling foils by creating an underpressure that presses the foil against the rigid plate thereby preventing the foil from wrinkling.

By this technique, the plate can be pressed against the foil with sufficient force to avoid wrinkles in the foil.

According to one embodiment, the optical element comprises a suction device connected to said plate and arranged to remove air from between said plate and said foil. This makes it possible to maintain the desired underpressure, even if the connection between the plate and the foil is not completely airtight.

In order to eliminate the need for a suction device or to improve the effect of the suction device, a seal may be provided along the edges of said plate, sealing the plate against the optical foil. Even a relatively simple sealing can drastically enhance the envisaged effect.

According to an embodiment of the invention, the optical element further comprises a second rigid, transparent plate, while said optical foil is arranged between said first and second plates, said plates being held together by means of underpressure.

In this configuration, the optical foil is held between the two plates, which are pressed together by the underpressure. Several foils can be arranged between the plates. Again, the underpressure may be maintained by a suction device.

As was mentioned above, a seal along the edges of the plates can eliminate the need for a suction device or enhance the effect of the suction device. In the embodiment with two plates, the sealing is preferably arranged between the two plates, thereby sealing off the space which is formed between them and in which the foil(s) is (are) arranged.

The optical element may have any suitable number of foils without reducing the advantages of the concept. It may also comprise a so-called honeycomb, i.e. an element of, for example, aluminum with a plurality of holes formed therein, for securing a straight path of light from the back lighting device. Such a combination of elements, sometimes referred to as an optical stack, can improve the qualities of a lighting device in general and of a back lighting device of an LCD in particular. By implementing the present invention, these qualities are further improved and made independent of heat variations.

In the embodiment with only one plate, the honeycomb, which by its construction allows air to pass through easily, is preferably arranged between the first plate and the foil. In the embodiment with two plates forming the end plates of a stack, the honeycomb element and the foils may be arranged in any order that is found advantageous.

These and other aspects of the invention will be apparent from the preferred embodiments described in more detail below with reference to the appended drawings.

The following description is based on the implementation of the optical element according to the invention in an LCD. It is emphasized that this is only one possible implementation and that the optical element according to the invention may also be used in other applications where light from a source is distributed.

Figure 1:
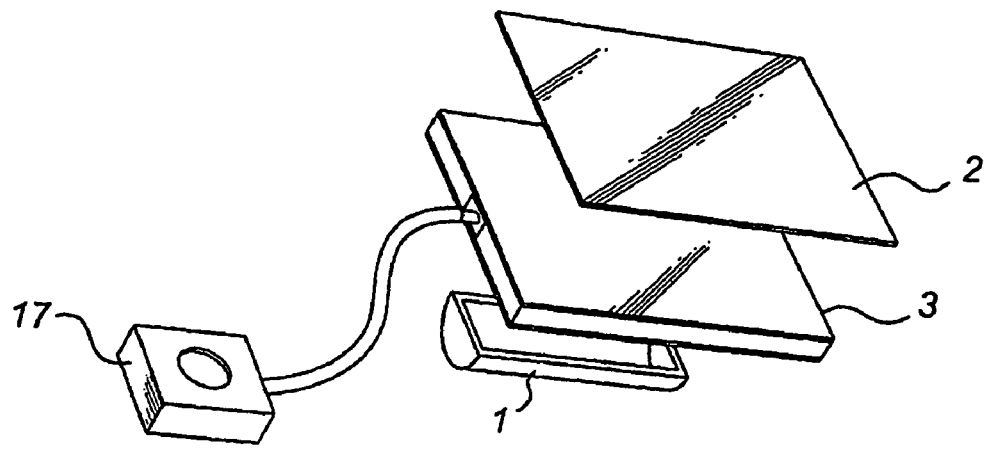
FIG. 1 is a schematic view of an LCD.

FIG. 1 shows some of the parts of an LCD display, namely a back lighting device 1, an LCD screen 2, and an optical element 3, arranged in between the lighting device 1 and the screen 2. The size of the screen depends on the application, but as an example the optical stack may be approximately 90 cm by 50 cm.

Figure 2:
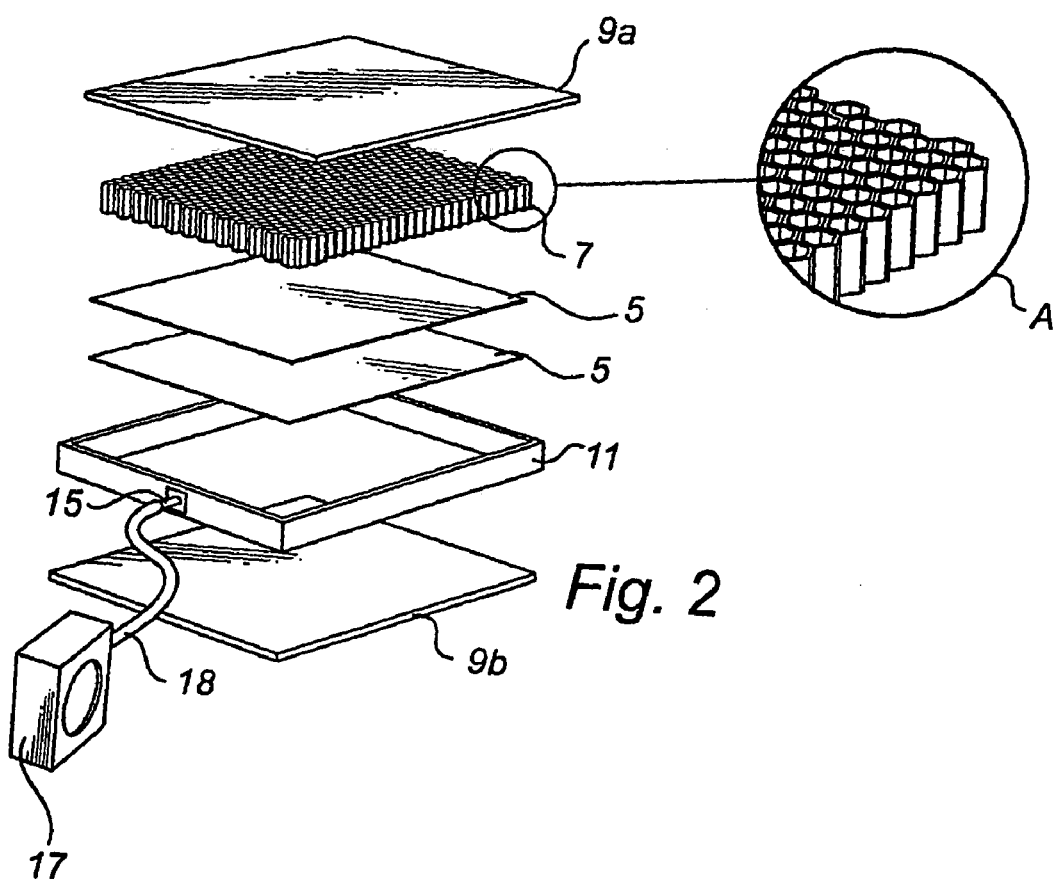
FIG. 2 is an exploded view of a first embodiment of an optical element according to the invention.

With reference now to FIG. 2, the optical element in FIG. 1 comprises a stack with two optical foils 5 and one honeycomb element 7 fitted between two transparent plates 9a, 9b. At least one of the plates is rigid in order to give the element structural strength. The optical foils are preferably made of plastic, and the plates are preferably made of glass. These are the conventional materials chosen, allowing for a cost-efficient and durable product.

The optical foils 5 in FIG. 2 each have a pattern of parallel grooves formed in at least one surface. Their purpose is to eliminate reflections in the back light from the lighting device 1. By arranging two foils in sequence, with their patterns aligned differently, for example perpendicularly, an even better effect is obtained.

The honeycomb element 7 may be made of aluminum and has a plurality of hexagon-shaped cells, forming a honeycomb pattern, as shown in the expanded section A. The cells are intended to ensure that the light from the back lighting device is straight. To improve their optical characteristics, the cells may be coated with an light-absorbing coating. In the preferred embodiment, the honeycomb is approximately 6 mm thick and the cells are 3 mm in diameter.

The glass plates 9a, 9b are relatively thin, for example approximately 1 mm thick, in order not to absorb or diffract the backlight to much. The glass plates, which are slightly bigger than the foils and the honeycomb element, are provided along their edges with a sealing 11 of, for example, metal. The sealing may be taped to the glass with adhesive tape. If required, the sealing is improved with a flexible putty material such as rubber or epoxy or an elastomer. The sealing 11 is adapted to make contact with both glass plates 9a, 9b when the optical element is assembled, thereby creating an essentially sealed space 13 in between the plates.

In view of the tolerances of the different components, for example of the honeycomb element 7, it may be advantageous to provide for a certain air gap between the plates. In this case it is preferred to add a flexible layer to the sealing, allowing for a further compression of the stack. The flexible layer may be allowed to harden while the stack is pressed together mechanically or otherwise.

Figure 3:
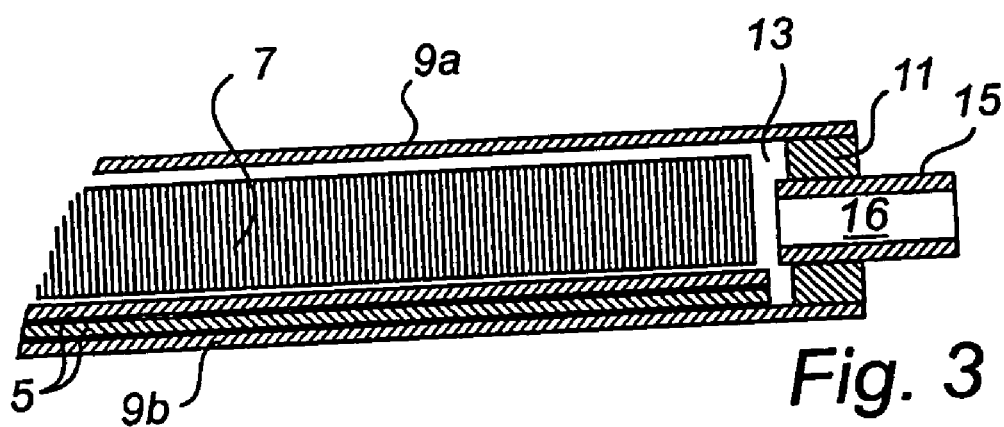
FIG. 3 is a side elevation of the optical element of FIG. 1.

With reference to FIG. 3, which is only schematic, a tube 15 is fitted in the sealing, thereby providing a channel 16 into the space 13 between the plates in which the foils 5 and honeycomb 7 are arranged. A suction device 17 (shown in FIG. 2), in the illustrated example a small blower or fan, is connected to the tube 15 by means of a plastic tube 18 or the like. The suction device 17 is adapted to remove air from the space 13, thereby pressing the plates 9a, 9b together.

In the currently implemented application, the blower 17 can bring the pressure in between the plates down to around 120 Pa, which has shown to be a suitable pressure. It has been found advantageous to prioritize the air flow capacity of the blower rather than the pressure itself. Thus, even though the metal seal 11 is not completely airtight, a small (low-power) blower can remove air at a sufficiently fast rate to preserve the desired underpressure.

In trial applications, a blower from Delta Electronics with the model number BFB0412HHA was found to be satisfactory. In order to reduce the additional noise generated by such a blower, it was placed in a housing and provided with a damper (not shown).

Note that it is not necessary to maintain the underpressure between the plates when the LCD is not in use, as the foils are then not subject to heat from the back lighting device. It is therefore preferred to connect the blower to the normal power supply of the LCD, activating the blower when the display is turned on.

As mentioned above, it is also possible to embody the invention without a suction device if a very tight seal can be arranged. The air between the plates then only needs to be removed once, creating a vacuum between the plates which will be maintained by the seal.

Figure 4:
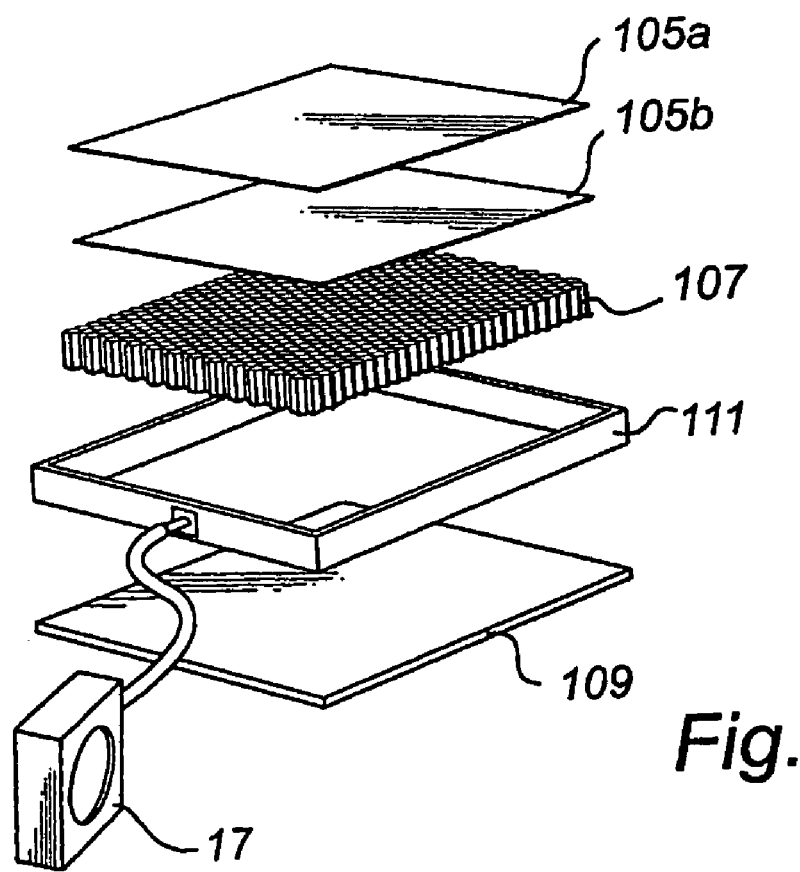
FIG. 4 is an exploded view of a second embodiment of an optical element according to the invention.

According to a second preferred embodiment of the invention, shown in FIG. 4, the optical element only comprises one glass plate, 109, provided with a sealing 111. It further comprises a stack with two optical foils 105a, 105b, the outer foil 105a being slightly larger than the inner foil 105b, thereby making contact with the sealing 111 and forming a sealed space 113 between the plate 109 and the outer foil 105a. Like the optical element of FIG. 2, the element in FIG. 4 may again comprise a honeycomb element 107, in this case placed between the inner foil 105b and the glass plate 109. The honeycomb 107 is similar in size to the inner foil 105b.

A suction device 117 is connected to the sealing 111 and arranged to remove air from the space 113, just as air is removed from between the plates 9a, 9b in FIG. 2. The resulting underpressure in space 113 presses the outer foil 105a towards the plate and sandwiches the inner foil 105b and the honey comb 107.

As was noted above, the suction device may be left out if an airtight seal can be arranged between the plate and the foil and all air is removed from between the plate and the foil.

It should be noted that the optical stacks described above are only examples and that many alternative configurations are possible, such as a stack with a different number of foils, without a honeycomb element, or comprising a different type of component in the underpressure space 13, 113.

The invention claimed is:

1. An optical stack for use with a liquid crystal display, comprising:
    a first rigid transparent plate having a perimeter;
    a second rigid transparent plate having a perimeter;
    a first optical foil configured to substantially eliminate reflections, in a first direction, that are associated with light from a light source;
    a collimator positioned between the first rigid transparent plate and the second rigid transparent plate; and
    a seal positioned along the perimeter of the first rigid transparent plate and the perimeter of the second rigid transparent plate;
    wherein the seal is configured to permit maintenance of an atmospheric pressure differential between an interior area of the optical stack and an area outside the optical stack, the interior area being defined by the first rigid transparent plate, the second rigid transparent plate, and the seal.

2. The optical stack of claim 1, further comprising a second optical foil configured to substantially eliminate reflections, in a second direction, that are associated with the light from the light source.

3. The optical stack of claim 2, wherein at least one optical foil of the first optical foil and the second optical foil is positioned between the first rigid transparent plate and the second rigid transparent plate.

4. The optical stack of claim 3, wherein the collimator comprises a honeycomb structure.

5. The optical stack of claim 4, wherein the seal is configured to permit attachment of an atmospheric pressure control device.

6. The optical stack of claim 5, further comprising an atmospheric pressure control device operatively connected to the seal and configured to adjust atmospheric pressure of the interior area of the optical stack.

7. The optical stack of claim 6, wherein the atmospheric pressure control device is a blower that is configured to remove an atmospheric gas from the interior area.

8. The optical stack of claim 7, further comprising a backlight configured to transmit light through the collimator.

9. The optical stack of claim 8, further comprising a liquid crystal display configured to use the backlight to form a viewable image.

10. An optical stack for use with a liquid crystal display, comprising:
- a rigid transparent plate having a perimeter;
- a first optical foil configured to substantially eliminate reflections, in a first direction, that are associated with light from a light source and having a perimeter;
- a collimator positioned between the first rigid transparent plate and the first optical foil; and
- a seal positioned along the perimeter of the rigid transparent plate and the perimeter of the first optical foil;
- wherein the seal is configured to permit maintenance of an atmospheric pressure differential between an interior area of the optical stack and an area outside the optical stack, the interior area being defined by the first rigid transparent plate, the first optical foil, and the seal.

11. The optical stack of claim 10, further comprising a second optical foil configured to substantially eliminate reflections, in a second direction, that are associated with the light from the light source.

12. The optical stack of claim 11, wherein the collimator comprises a honeycomb structure.

13. The optical stack of claim 12, wherein the seal is configured to permit attachment of an atmospheric pressure control device.

14. The optical stack of claim 13, further comprising an atmospheric pressure control device operatively connected to the seal and configured to adjust atmospheric pressure of the interior area of the optical stack.

15. The optical stack of claim 14, wherein the atmospheric pressure control device is a blower that is configured to remove an atmospheric gas from the interior area.

16. The optical stack of claim 15, further comprising a backlight configured to transmit light through the collimator.

17. The optical stack of claim 16, further comprising a liquid crystal display configured to use the backlight to form a viewable image.

18. An optical element, comprising:
- first means for substantially eliminating light reflections in a first direction;
- second means for substantially eliminating light reflections in a second direction that is different from the first direction;
- means for collimating light; and
- means for operatively securing together the first means for substantially eliminating light reflections, the second means for substantially eliminating light reflections, and the means for collimating light, wherein the means for operatively securing together includes at least one transparent rigid member and a seal that is configured to permit maintenance of an atmospheric pressure differential between an internal area of the means for operatively securing and an area outside the internal area.

19. The optical element of claim 18, further comprising means for providing light configured to transmit light through the means for collimating.

20. The optical element of claim 19, further comprising a liquid crystal display configured to use the means for providing light to form a viewable image.

* * * * *